(12) United States Patent
Hérault (10) Patent No.: US 10,329,018 B2
(45) Date of Patent: Jun. 25, 2019

(54) DEPLOYABLE PANEL ASSEMBLY

(71) Applicant: Zodiac Seats France, Issoudun (FR)

(72) Inventor: Patrick Hérault, Saint-Hilaire-en-Lignières (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 15/302,469

(22) PCT Filed: Apr. 6, 2015

(86) PCT No.: PCT/IB2015/052484
§ 371 (c)(1),
(2) Date: Oct. 6, 2016

(87) PCT Pub. No.: WO2015/155668
PCT Pub. Date: Oct. 15, 2015

(65) Prior Publication Data
US 2017/0029114 A1 Feb. 2, 2017

Related U.S. Application Data

(60) Provisional application No. 61/976,037, filed on Apr. 7, 2014.

(51) Int. Cl.
*B64D 11/00* (2006.01)
*B64D 11/06* (2006.01)

(52) U.S. Cl.
CPC ........ *B64D 11/00153* (2014.12); *B64D 11/06* (2013.01); *B64D 11/0604* (2014.12)

(58) Field of Classification Search
CPC .............. B64D 11/00153; B64D 11/06; B64D 11/0604

USPC .......... 248/917, 155.2, 167, 415, 425, 183.1
See application file for complete search history.

(56) References Cited

U.S. PATENT DOCUMENTS

| 5,096,271 | A | 3/1992 | Portman | |
|---|---|---|---|---|
| 6,199,809 | B1* | 3/2001 | Hung | A47B 21/0314 248/281.11 |
| 6,769,657 | B1* | 8/2004 | Huang | F16M 11/10 248/278.1 |
| 7,178,871 | B1* | 2/2007 | Round | B60N 2/242 297/244 |

(Continued)

FOREIGN PATENT DOCUMENTS

| DE | 102007025881 | 12/2008 |
|---|---|---|
| WO | 2000021831 | 4/2000 |
| WO | 2015155668 | 10/2015 |

OTHER PUBLICATIONS

International Patent Application No. PCT/IB2015/052484, Search Report and Written Opinion dated Jul. 6, 2015.

*Primary Examiner* — Muhammad Ijaz
(74) *Attorney, Agent, or Firm* — Kilpatrick Townsend & Stockton LLP; Dean W. Russell; Davidson G. Lucas (57) ABSTRACT

Disclosed is a deployable panel assembly that includes a support plate (101), a front support arm (105) with a first end having at least two pivotable attachments (106, 107) to a first edge of the support plate (101) and a second end having at least two pivotable attachments (108, 109) to a seat shell, and a rear support arm (110) with a first end (111) pivotably attached to a second edge of the support plate (101) and a second end (112) pivotably attached to the seat shell, wherein the support plate is configured to move between a stowed position and a deployed position.

22 Claims, 6 Drawing Sheets (56) References Cited

U.S. PATENT DOCUMENTS

| | | | | |
|---|---|---|---|---|
| 7,630,193 B2* | 12/2009 | Ledbetter | ............... | F16M 11/10 |
| | | | | 361/679.21 |
| 7,852,622 B2* | 12/2010 | Ferren | .................... | B60K 35/00 |
| | | | | 248/917 |
| 8,613,385 B1 | 12/2013 | Hulet et al. | | |
| 8,888,060 B2* | 11/2014 | Hirota | ................ | B60R 11/0235 |
| | | | | 248/201 |
| 2006/0238661 A1* | 10/2006 | Oh | ........................ | F16M 11/18 |
| | | | | 348/825 |
| 2007/0023599 A1* | 2/2007 | Fedewa | .................. | F16M 11/10 |
| | | | | 248/284.1 |
| 2007/0262625 A1 | 11/2007 | Dryburgh et al. | | |
| 2009/0057514 A1* | 3/2009 | Oh | ........................ | F16M 11/08 |
| | | | | 248/282.1 |
| 2010/0060044 A1 | 3/2010 | Pozzi et al. | | |
| 2012/0001044 A1* | 1/2012 | Gwag | ................... | F16M 11/10 |
| | | | | 248/277.1 |
| 2014/0043736 A1* | 2/2014 | Onda | .................. | H05K 5/0217 |
| | | | | 361/679.01 |

\* cited by examiner

DEPLOYABLE PANEL ASSEMBLY

CROSS REFERENCE TO RELATED APPLICATIONS

This application is the U.S. national phase entry of International Patent Application Serial No. PCT/IB2015/052484 ("the '484 application"), filed on Apr. 6, 2015, which application is related to and claims priority benefits from U.S. Provisional Application Ser. No. 61/976,037 ("the '037 application"), filed on Apr. 7, 2014, entitled DOUBLE PIVOT VIDEO ARMS. The '484 and '037 applications are hereby incorporated in their entireties by this reference.

FIELD OF THE INVENTION

The field of the invention relates to entertainment features and passenger seats for aircraft or the like.

BACKGROUND

Many passenger seats such as those on passenger aircraft, buses, trains, and the like include mechanisms related to passenger comfort, convenience, and/or entertainment. For example, some seat shell assemblies are designed to include convenience and entertainment features (which may be moveable or deployable) including, for example, video monitors and the like. The design of conventional seat shells along with the design of the convenience and entertainment features may include inefficiencies that lead to reduced space and inadequate ergonomics for passengers.

In certain situations, it may be desirable to design seat shells and related subcomponents to maximize passenger space and enhance passenger ergonomics. Efficient seat shell and convenience and entertainment feature design facilitates advantageous ergonomics and passenger comfort.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a deployable panel assembly comprises: a support plate; a front support arm with a first end pivotably attached to the support plate; and a rear support arm with a first end pivotably attached to the support plate, wherein the support plate is configured to move between a stowed position and a deployed position.

In some embodiments, a second end of the front support arm is pivotably attached to a seat shell; and a second end of the rear support arm is pivotably attached to the seat shell.

In certain embodiments, when in the stowed position, the support plate is approximately parallel to a surface of the seat shell. In some embodiments, when moving from the stowed position to the deployed position, the support plate moves away from the seat shell and away from a passenger occupancy space. In certain embodiments, the movement between the stowed position and the deployed position includes a complex kinematic motion path that includes both rectilinear and rotational movement.

In some embodiments, the first end of the front support arm comprises an upper pivotable attachment to the support plate and a lower pivotable attachment to the support plate.

The second end of the front support arm, in certain embodiments, comprises an upper pivotable attachment to the seat shell and a lower pivotable attachment to the seat shell.

The second end of the rear support arm, in certain embodiments, comprises a tab configured to rotate with respect to a wall fitting about a pin. In some embodiments, the tab comprises an arced slot configured to slide along a stationary pin. In certain embodiments, the tab comprises a deployment motion stop configured to contact the stationary pin when the support plate is in the deployed position.

According to certain embodiments of the present invention, a deployable panel assembly comprises: a support plate; a video screen attached to the support plate; a front support arm with a first end having at least two pivotable attachments to a first edge of the support plate and a second end having at least two pivotable attachments to a seat shell; and a rear support arm with a first end pivotably attached to a second edge of the support plate and a second end pivotably attached to the seat shell, wherein the support plate is configured to move between a stowed position and a deployed position.

The second end of the front support arm, in certain embodiments, is pivotably attached to the seat shell at a location closer to a passenger occupancy space compared to the second end of the rear support arm.

In some embodiments, when in the stowed position, the support plate is approximately parallel to a surface of the seat shell.

In certain embodiments, when moving from the stowed position to the deployed position, the support plate moves away from the seat shell and away from a passenger occupancy space. In some embodiments, the movement between the stowed position and the deployed position includes a complex kinematic motion path that includes both rectilinear and rotational movement.

The first end of the front support arm, in some embodiments, comprises an upper pivotable attachment disposed adjacent to an upper edge of the support plate and a lower pivotable attachment disposed adjacent to a lower edge of the support plate.

The second end of the front support arm, in certain embodiments, comprises an upper pivotable attachment to a first fitting of the seat shell and a lower pivotable attachment to a second fitting of the seat shell.

In some embodiments, the second end of the rear support arm comprises a tab configured to rotate with respect to a wall fitting about a pin.

The tab, in some embodiments, comprises an arced slot configured to slide along a stationary pin. In certain embodiments, the tab comprises a deployment motion stop configured to contact the stationary pin when the support plate is in the deployed position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-5 illustrate embodiments of a deployable panel assembly 100. In these embodiments, the deployable panel assembly 100 comprises a support plate 101, a front support arm 105, and a rear support arm 110, and is configured to move between a stowed position and a deployed position. The support plate 101 may include an inner edge with one or more attachments to the front support arm 105 and may include an outer edge with one or more attachments to the rear support arm 110. The support plate 101 may be configured to secure a video screen 250 or another entertainment device.

Figure 1A:
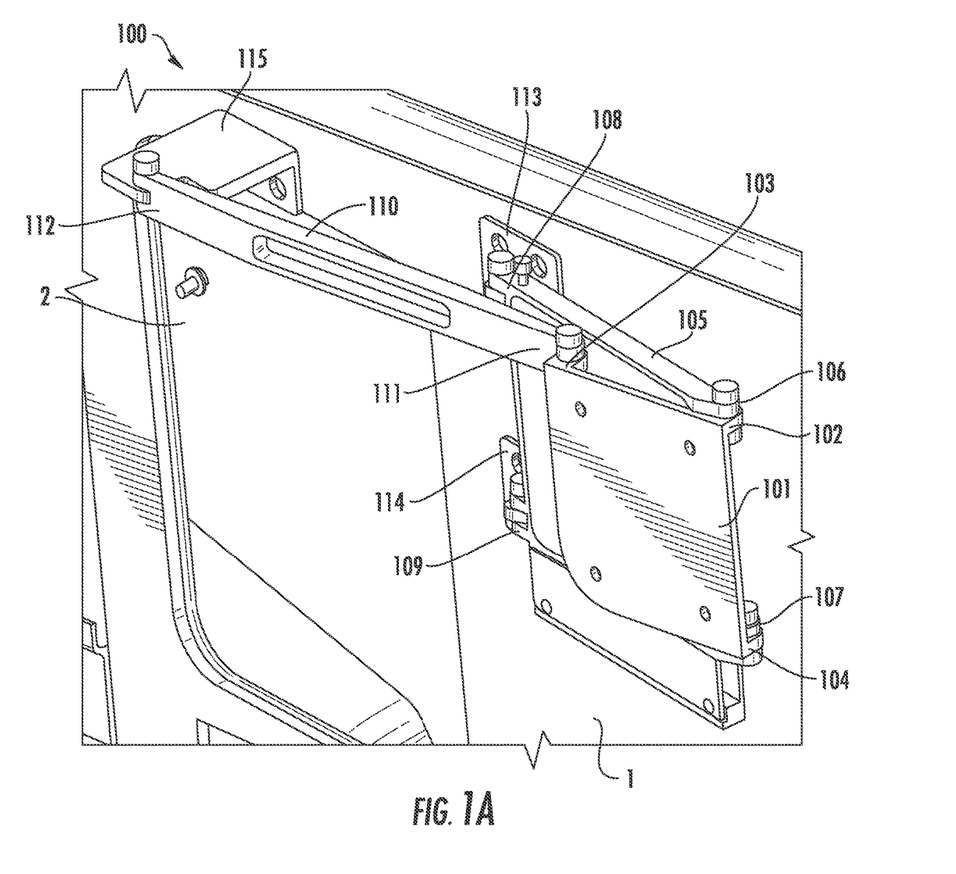
FIGS. 1A and 1B are perspective views of deployable panel assemblies according to certain embodiments of the present invention.
Figure 1B:
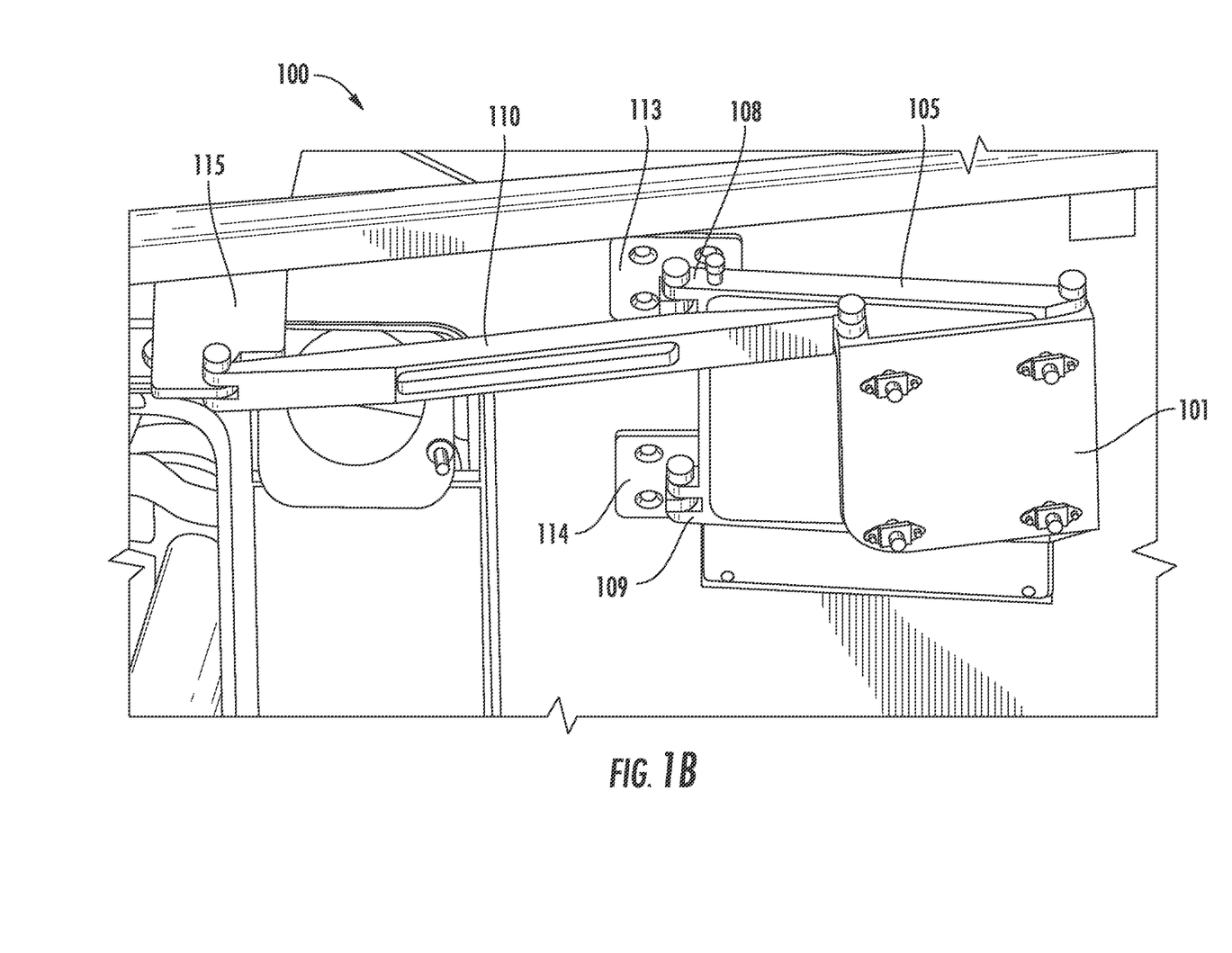

As shown in FIGS. 1A and 1B, the deployable panel assembly 100 may be attached to the surface of a seat shell 1 and may be configured such that the support plate 101 folds approximately flat against the surface of the seat shell 1 when in the stowed position. In some embodiments, the front support arm 105 may include (1) an upper wall attachment 108 that attaches to an upper wall fitting 113, which is secured to the surface of seat shell 1 and (2) a lower wall attachment 109 that attaches to a lower wall fitting 114, which is secured to the surface of seat shell 1. In some embodiments, the seat shell 1 may include an opening 2, as shown in FIG. 1A.

In some embodiments, the front support arm 105 extends in the vertical direction for approximately the full height of the support plate 101 and includes an upper attachment 106 and a lower attachment 107. As shown in FIG. 1A, the upper attachment 106 of the front support arm 105 may interface with upper front fitting 102 of the support plate 101 and the lower attachment 107 of the front support arm 105 may interface with lower fitting 104 of the support plate 101.

Although not illustrated in the figures, the front support arm 105 may be designed with any appropriate number of attachments to the surface of the seat shell 1 and/or to the support plate 101. In other words, with respect to the interface with seat shell 1, the front support arm 105 may include (a) only one of upper wall fitting 113 and lower wall fitting 114; (b) both upper wall fitting 113 and lower wall fitting 114; or (c) upper wall fitting 113, lower wall fitting 114, and one or more additional wall fittings. Similarly and independent of the attachment to the seat shell 1, with respect to the interface with support plate 101, the front support arm 105 may include (a) only one of upper attachment 106 and lower attachment 107; (b) both upper attachment 106 and lower attachment 107; or (c) upper attachment 106, lower attachment 107, and one or more additional wall attachments.

As with the number of connections described above, there are numerous variations for the type of mechanical connection between the front support arm 105 and the seat shell 1 and between the front support arm 105 and the support plate 101. For example, although each connection is illustrated as a lug/clevis with a rotational axis, one or more of the connections to the front support arm 105 may include a spherical bearing or a ball and socket joint to allow rotation in multiple axes.

The rear support arm 110 may include a front portion 111 that attaches to upper rear fitting 103 and a rear portion 112 that interfaces with rear wall fitting 115. As described for the front support arm 105, although not illustrated in the figures, the rear support arm 110 (1) may be designed with any appropriate number of attachments to the surface of the seat shell 1 and/or to the support plate 101 and (2) may be designed for numerous variations for the type of mechanical connection between the rear support arm 110 and the seat shell 1 and between the rear support arm 110 and the support plate 101.

Figure 5:
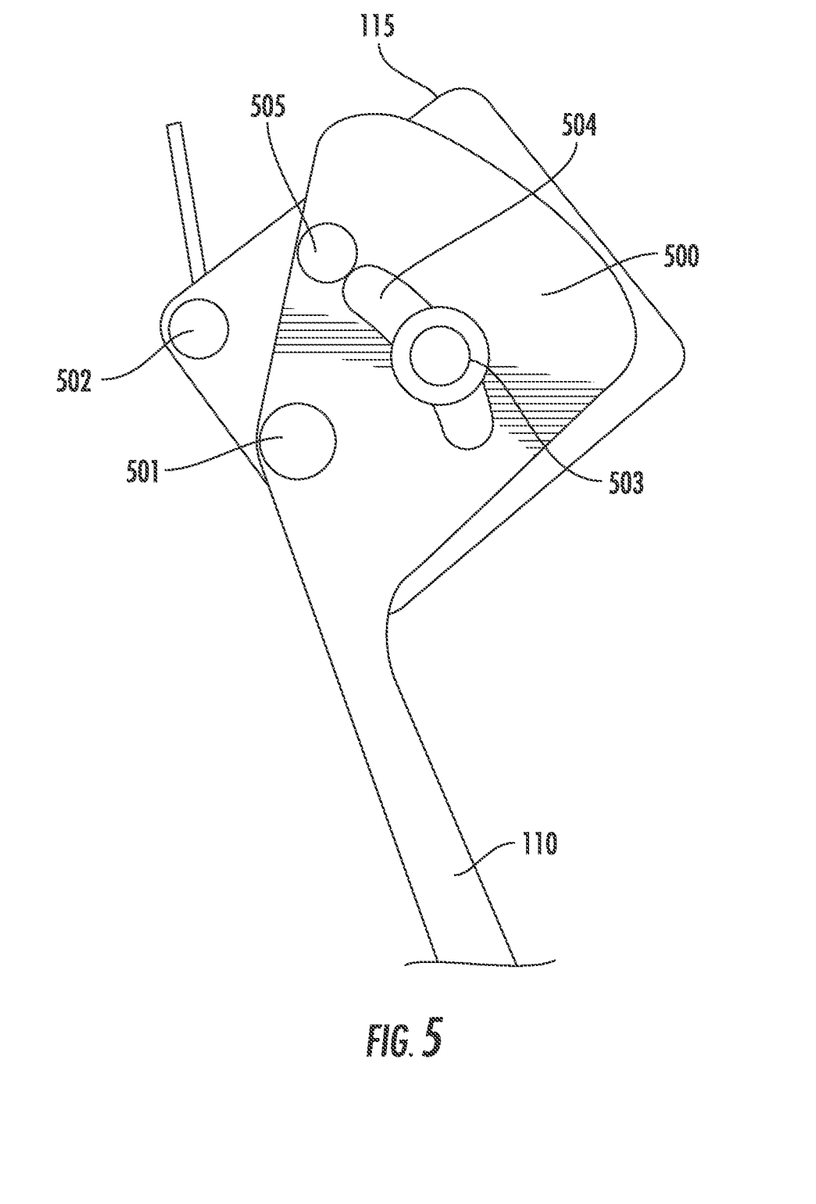
FIG. 5 is a detail view of deployable panel assemblies according to certain embodiments of the present invention.

In some embodiments, as shown in FIG. 5, the rear portion 112 of rear support arm 110 is replaced with a tab 500. Tab 500 interfaces with and rotates about a pin 501 connected to rear wall fitting 115. To guide and constrain the motion of rear support arm 110, the tab 500 includes an arced slot 504, which interfaces with a stationary pin 503 (which may include bearings or a component for reducing friction) attached to rear wall fitting 115. In some embodiments, arced slot 504 has a center corresponding to pin 501 such that, when rear support arm 110 rotates about pin 501, the arced slot 504 slides along stationary pin 503. To limit motion at the deployed position (see FIG. 3G), tab 500 includes a deployment motion stop 505, which is disposed adjacent to one end of the arced slot 504 (see FIG. 5) such that the stationary pin 503 will contact the deployment motion stop 505 when rear support arm 110 reaches the deployed position. To limit motion at the stowed position (see FIG. 3A), rear wall fitting 115 includes a stowage motion stop 502, which is disposed adjacent to one edge of the rear wall fitting 115 (see FIG. 5) such that the stowage motion stop 502 will contact an edge of the tab 500 when rear support arm 110 reaches the stowed position. In some embodiments, the deployment motion stop 505 and the stowage motion stop 502 may include a soft touch material (i.e., rubber, polymer, plastic, or another suitable material) to reduce shock and/or vibration related to contact at either the deployed or stowed positions.

Figure 2A:
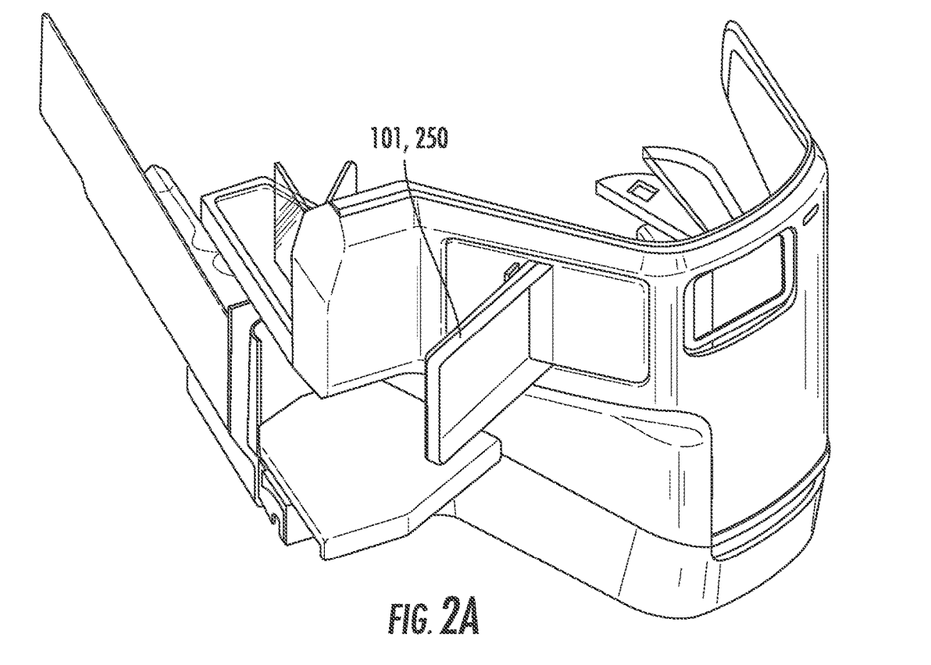
FIGS. 2A and 2B are perspective views of the deployable panel assemblies of FIGS. 1A and 1B.
Figure 2B:
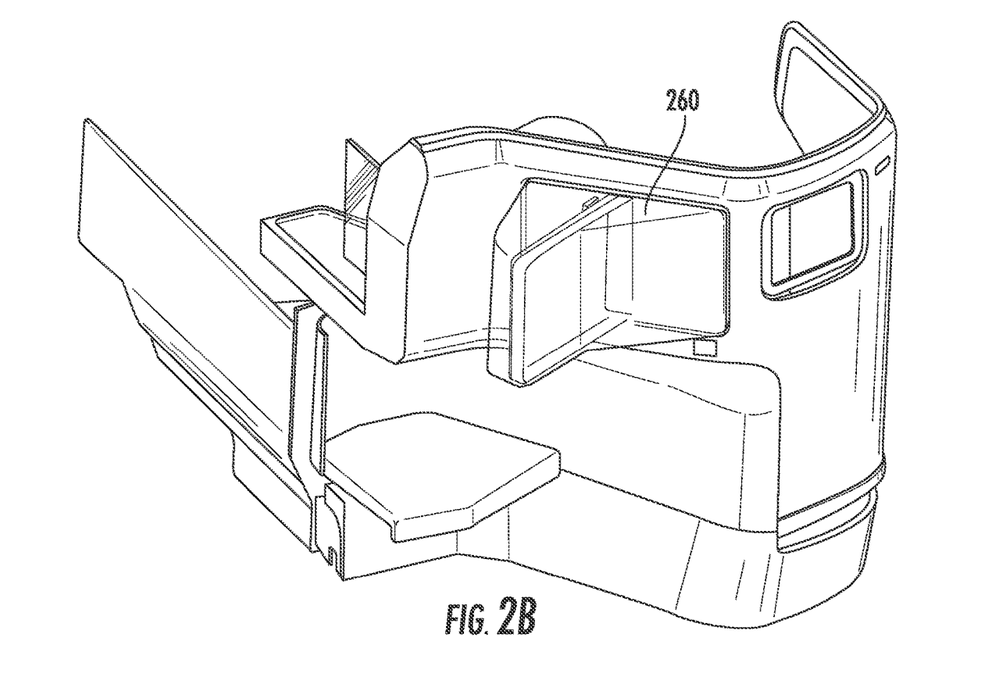

FIG. 2A shows the support plate 101 and a video screen 250 in the deployed position where a passenger's line of sight is approximately perpendicular to the surface of video screen 250 such that the passenger occupancy space is located toward the bottom right corner for FIG. 2A. FIG. 3G also illustrates the deployed position and shows the arrangement of front support arm 105 and rear support arm 110 when deployed. FIG. 2B shows a swept volume 260 that represents the full motion of the support plate 101 and the video screen 250 between the stowed position and the deployed position.

Figure 3A:
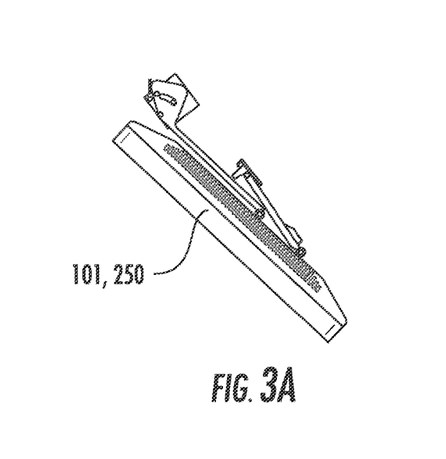
FIGS. 3A, 3B, 3C, 3D, 3E, 3F, and 3G are top views of deployable panel assemblies according to certain embodiments of the present invention.
Figure 3B:
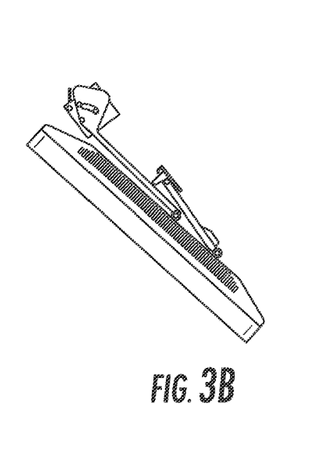
Figure 3C:
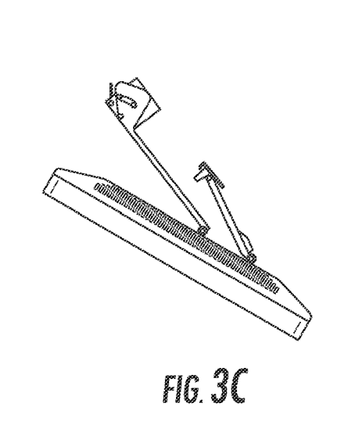
Figure 3D:
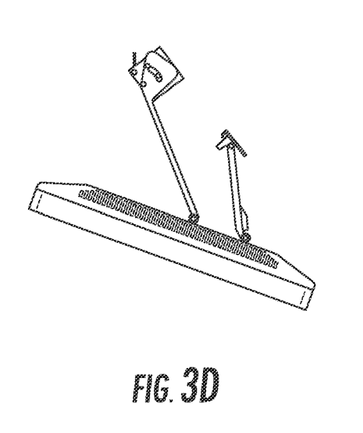
Figure 3E:
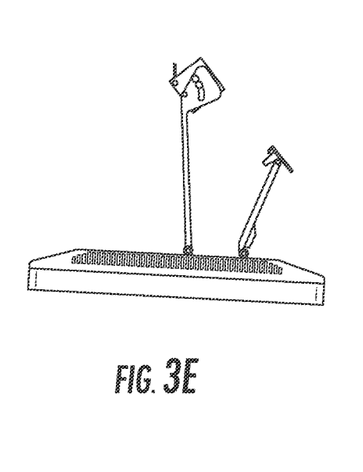
Figure 3F:
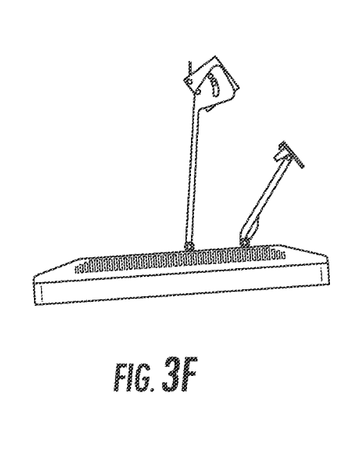
Figure 3G:
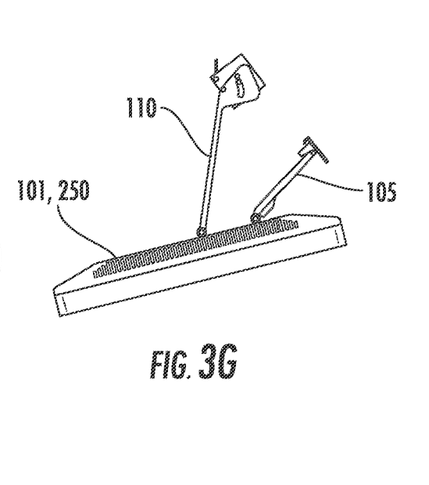
Figure 4:
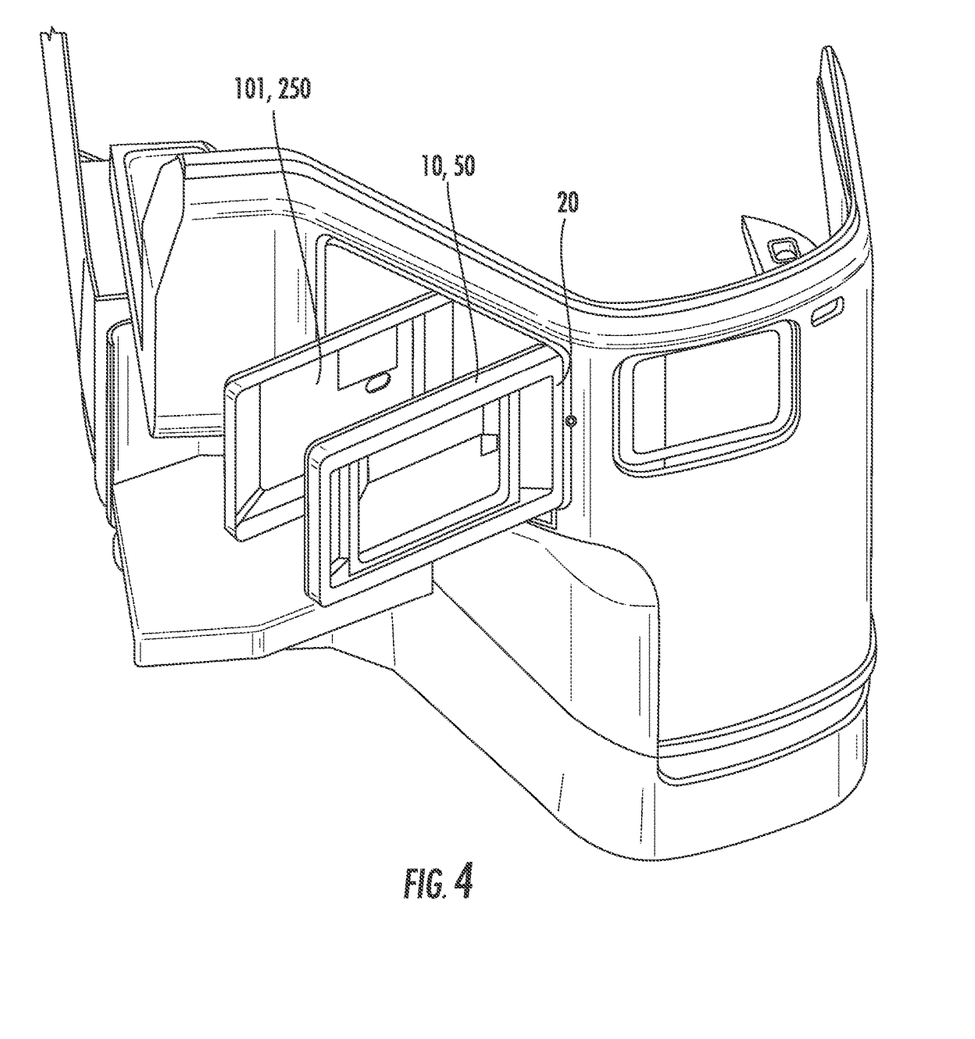
FIG. 4 is a perspective view of deployable panel assemblies according to certain embodiments of the present invention.

FIGS. 3A-3G show a progression of the support plate 101 and the video screen 250 from the stowed position (FIG. 3A) to the deployed position (FIG. 3G). As shown in FIGS. 3A-4, the support plate 101 and the video screen 250, when moving from the stowed position to the deployed position move away from the seat shell and away from the passenger occupancy space. In other words, the support plate 101 and the video screen 250 do not merely pivot; they follow a complex kinematic motion path that includes both rectilinear and rotational movement.

In some situations, a support plate 10 and video screen 50, which are attached to a seat shell with a single axis hinge 20, use the same stowed position as that of the support plate 101 and the video screen 250. However, as shown in FIG. 4, because support plate 10 and video screen 50 merely rotate about the single axis hinge 20, support plate 10 and video screen 50 are offset a distance X from support plate 101 and the video screen 250. The distance X represents a significant decrease in passenger space. In other words, implementing deployable panel assembly 100 moves the deployed location from the location occupied by support plate 10 and video screen 50 by a distance X. In addition to increasing passenger space, the distance X also allows a passenger a better viewing angle for the video screen 250.

The components of the deployable panel assembly 100 may be formed of materials including, but not limited to, carbon composite, plastic, thermoplastic, steel, aluminum, stainless steel, other plastic or polymer materials, other metallic materials, other composite materials, or other similar materials. Moreover, the components of the deployable panel assembly 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A deployable panel assembly comprising:
a support plate;
a stowed configuration;
a deployed configuration;
a front support arm with a first end pivotably attached to the support plate and a second end comprising a direct pivotable attachment to a seat shell; and
a rear support arm with a first end pivotably attached to the support plate, wherein:
the rear support arm is longer than the front support arm;
the first end of the front support arm comprises an upper pivotable attachment connected to the support plate and a lower pivotable attachment connected to the support plate; and
the second end of the front support arm comprises an upper pivotable attachment connected to the seat shell and a lower pivotable attachment connected to the seat shell.

2. The deployable panel assembly of claim 1, wherein:
a second end of the rear support arm is pivotably attached to the seat shell.

3. The deployable panel assembly of claim 2, wherein:
the second end of the rear support arm comprises a tab configured to rotate with respect to a wall fitting about a pin; and
the tab comprises an arced slot configured to slide along a stationary pin.

4. The deployable panel assembly of claim 3, wherein the tab comprises a deployment motion stop configured to contact the stationary pin when the support plate is in the deployed configuration, wherein the deployment motion stop comprises a protrusion extending from a surface of the tab.

5. The deployable panel assembly of claim 4, wherein:
the protrusion of the deployment motion stop comprises a cylindrical shape and the deployment motion stop is disposed adjacent to the arced slot; and
the wall fitting comprises a stowage motion stop that contacts an edge of the tab when the deployable panel assembly is in the stowed configuration, wherein the stowage motion stop comprises a protrusion extending from a surface of the wall fitting.

6. The deployable panel assembly of claim 1, wherein, when in the deployed configuration, the rear support arm is disposed at a first angle relative to a position of the rear support arm in the stowed configuration, when in the deployed configuration, the front support arm is disposed at a second angle relative to a position of the front support arm in the stowed configuration, and the second angle is larger than the first angle.

7. The deployable panel assembly of claim 1, wherein:
when in the stowed configuration, the support plate is approximately parallel to a surface of the seat shell, and when in the deployed configuration, the support plate is at least 45° relative to the surface of the seat shell; and
the deployed configuration is offset in a rectilinear direction relative to the stowed configuration, wherein the rectilinear direction is parallel to the surface of the seat shell.

8. The deployable panel assembly of claim 1, wherein the front support arm and the rear support arm neither intersect nor attach to one another.

9. The deployable panel assembly of claim 1, wherein, during a full range of motion between the stowed configuration and the deployed configuration, the front support arm and the rear support arm are oblique relative to one another.

10. A deployable panel assembly comprising:
a support plate;
a video screen attached to the support plate;
a stowed configuration;
a deployed configuration;
a front support arm with a first end having at least two pivotable attachments connected to a first edge of the support plate and a second end having at least two pivotable attachments directly connected to a seat shell; and
a rear support arm with a first end comprising a pivotable attachment connected to a second edge of the support plate and a second end comprising a pivotable attachment connected to the seat shell, wherein the rear support arm is longer than the front support arm.

11. The deployable panel assembly of claim 10, wherein the second end of the front support arm is pivotably attached to the seat shell at a location closer to a passenger occupancy space compared to the second end of the rear support arm.

12. The deployable panel assembly of claim 10, wherein, when in the stowed configuration, the support plate is approximately parallel to a surface of the seat shell.

13. The deployable panel assembly of claim 10, wherein, when in the deployed configuration, the rear support arm is disposed at a first angle relative to a position of the rear support arm in the stowed configuration, the front support arm is disposed at a second angle relative to a position of the front support arm in the stowed configuration, and the second angle is larger than the first angle.

14. The deployable panel assembly of claim 10, wherein the deployed configuration is offset in a rectilinear direction relative to the stowed configuration, wherein the rectilinear direction is parallel to a surface of the seat shell.

15. The deployable panel assembly of claim 10, wherein the at least two pivotable attachments of the first end of the front support arm comprise an upper pivotable attachment connected to an upper edge of the support plate and a lower pivotable attachment connected to a lower edge of the support plate.

16. The deployable panel assembly of claim 10, wherein the second end of the rear support arm comprises a tab configured to rotate with respect to a wall fitting about a pin.

17. The deployable panel assembly of claim 16, wherein the tab comprises an arced slot configured to slide along a stationary pin.

18. The deployable panel assembly of claim 17, wherein the tab comprises a deployment motion stop configured to contact the stationary pin when the support plate is in the deployed configuration, wherein the deployment motion stop comprises a protrusion extending from a surface of the tab.

19. The deployable panel assembly of claim 18, wherein:
the protrusion of the deployment motion stop comprises a cylindrical shape and the deployment motion stop is disposed adjacent to the arced slot; and
the wall fitting comprises a stowage motion stop that contacts an edge of the tab when the deployable panel assembly is in the stowed configuration, wherein the stowage motion stop comprises a cylindrical protrusion extending from a surface of the wall fitting.

20. The deployable panel assembly of claim 10, wherein the front support arm and the rear support arm neither intersect nor attach to one another.

21. The deployable panel assembly of claim 10, wherein, during a full range of motion between the stowed configuration and the deployed configuration, the front support arm and the rear support arm are oblique relative to one another.

22. A deployable panel assembly comprising:
a support plate;
a stowed configuration;
a deployed configuration;
a front support arm with a first end pivotably attached to the support plate and a second end comprising a direct pivotable attachment to a seat shell; and
a rear support arm with a first end pivotably attached to the support plate and a second end pivotably attached to the seat shell, wherein:
the rear support arm is longer than the front support arm;
the second end of the rear support arm comprises a tab configured to rotate with respect to a wall fitting about a pin; and
the tab comprises (i) an arced slot configured to slide along a stationary pin and (ii) a deployment motion stop configured to contact the stationary pin when the support plate is in the deployed configuration, wherein the deployment motion stop comprises a protrusion extending from a surface of the tab.

* * * * *